United States Patent [19]

Palm

[11] Patent Number: 4,643,888
[45] Date of Patent: Feb. 17, 1987

[54] PROCESS AND APPARATUS FOR RECOVERY OF SULFUR FROM AMMONIA CONTAINING ACID GAS STREAMS

[75] Inventor: John W. Palm, Tulsa, Okla.

[73] Assignee: Amoco Corporation, Chicago, Ill.

[21] Appl. No.: 714,298

[22] Filed: Mar. 21, 1985

[51] Int. Cl.⁴ .................. C01B 17/04; B01D 53/34; B01D 53/36
[52] U.S. Cl. ............................... 423/574 R; 55/70; 422/171; 422/190; 423/237
[58] Field of Search ............... 423/574 R, 574 G, 576, 423/237, 238; 422/115, 171, 190; 55/70

[56] References Cited

U.S. PATENT DOCUMENTS 4,075,310 2/1978 Fischer ........................ 423/574 R
4,243,647 1/1981 Hass et al. ................... 423/573 G
4,391,790 7/1983 Palm et al. .................. 423/574 R Primary Examiner—John Doll
Assistant Examiner—Jeffrey E. Russel

[57] ABSTRACT

A regeneration effluent stream containing ammonia from an adsorptive Claus reactor is processed to produce a stream enriched in ammonia and an ammonia-lean regeneration effluent stream. The stream enriched in ammonia is processed to reduce the concentration of ammonia therein.

16 Claims, 1 Drawing Figure

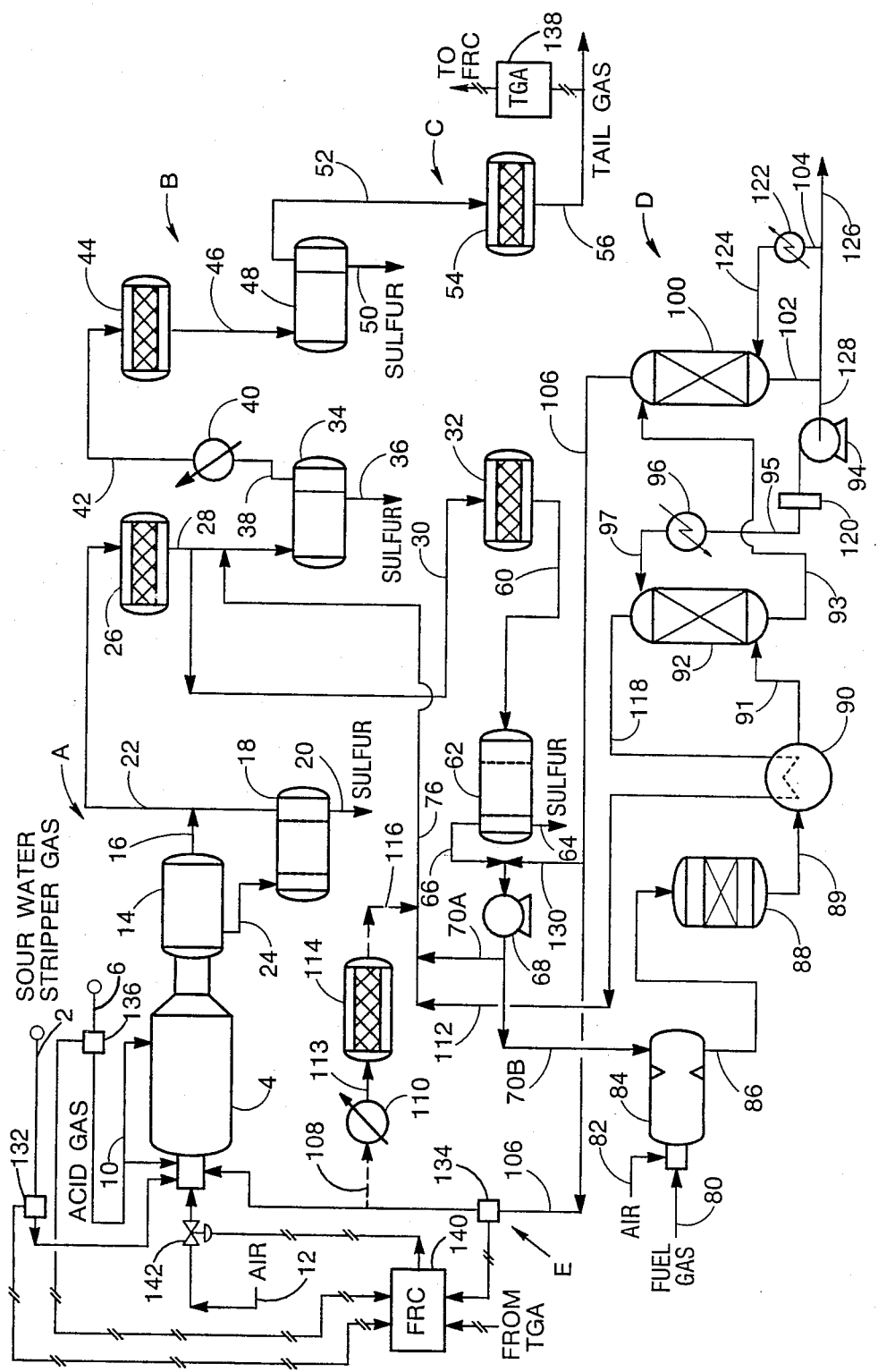

PROCESS AND APPARATUS FOR RECOVERY OF SULFUR FROM AMMONIA CONTAINING ACID GAS STREAMS

FIELD OF THE INVENTION

The present invention relates to process and apparatus for the recovery of elemental sulfur from feed streams containing ammonia. In a particular aspect, the invention relates to process and apparatus for minimizing the amount of ammonia present in a tail gas clean-up unit and thus prevent plugging of equipment with ammonium compounds.

BACKGROUND OF THE INVENTION

Many crude oils processed by refineries contain varying amounts of nitrogen and sulfur compounds. During the refining process, it frequently becomes necessary to remove such compounds because they impart undesired properties such as disagreeable odor, corrosivity, poor color, and the like, to salable products. In addition, the compounds may have deleterious effects in various catalytic refining processes applied to oils.

Various processes have been devised for removing the nitrogen and sulfur compounds from oils, one common process being treatment with hydrogen wherein the nitrogen and sulfur compounds are converted to ammonia ($NH_3$) and hydrogen sulfide ($H_2S$). Such conversion is usually promoted by use of elevated temperatures and pressures in the presence of hydrogenation catalysts. Reactions of the nitrogen and sulfur compounds with hydrogen to form $NH_3$ and $H_2S$ can also occur in other processes such as thermal and catalytic cracking, reforming, and hydrocracking, which are not specifically designed for such purpose. There are thus produced various effluent gas streams containing $NH_3$ and $H_2S$.

The removal of some $NH_3$ and $H_2S$ from such effluent streams may be accomplished by scrubbing with water, preferably at elevated pressure and low temperature. To obtain the desired extent of removal, however, it is often necessary to use a rather large amount of water so that a dilute aqueous solution of ammonia and $H_2S$ is formed. With increasing urbanization and concentration of industrial complexes, the situation is rapidly developing where pollution of water near population centers with such compounds is not desirable. The refiner thus may be compelled to remove the $NH_3$ and $H_2S$ from such waters in, for example, a sour water stripper resulting in a need to then dispose of the resulting $NH_3$ and $H_2S$ vapor.

In many cases, it is desirable to use the hydrogen sulfide present in such mixtures as feed to a sulfur recovery operation; however, the presence of ammonia can give rise to complications. While processes exist which are capable of effecting separation of ammonia from hydrogen sulfide, such methods require a large capital investment and the operating costs are relatively high.

In conventional sulfur recovery operations in which the feed gas typically contains more than 50 mol percent hydrogen sulfide with no significant concentration of ammonia, all of the acid gas feed is introduced into a noncatalytic combustion zone or furnace together with enough oxygen ordinarily in the form of air to convert about one-third of the hydrogen sulfide into sulfur dioxide. If the conventional method just described is used in the case of ammonia-contaminated hydrogen sulfide streams, even when sufficient additional air to burn ammonia is added, the hydrogen sulfide present competes with the ammonia for the extra oxygen, resulting oftentimes in incomplete combustion of the ammonia. The presence of excessive concentrations of ammonia in the combustion products creates conditions downstream for the formation of ammonium salts, which tend to accumulate in the equipment as solid materials and may cause plugging in catalytic reactors, in the condenser tubes, the tail gas scrubber system, sulfur separator seal legs, and the like. The failure of oxygen to effect complete combustion was borne out in tests performed where ammonia was purposely added to the feed. In a plant test, ammonia was present in the feed to the extent of about 23 volume percent or 230,000 ppm (dry basis). A conversion of about 99.7% was achieved in the furnace and the effluent had an ammonia concentration of about 200 ppm. In a second case (a laboratory run in which the feed contained 15 volume percent (dry basis) $NH_3$), the ammonia conversion exceeded 99.9% and the furnace effluent had an ammonia concentration of about 35 ppm.

We have found in the past that an improved method for handling a gas stream which contains ammonia in a conventional sulfur plant is to feed all of the ammonia-containing gas to the burner of the furnace together with a portion of ammonia-free acid gas, while the remaining ammonia-free acid gas is fed to a downstream point. See Canadian Pat. No. 928,043 (1973). This makes it possible to achieve ammonia conversions in a plant furnace as high as indicated above for the laboratory test. In plant units with this design which do not have tail gas clean-up units, the resulting ammonia at low concentration has passed through the condensers and catalyst beds and the accumulation of solid byproduct materials, if any, has not been great enough to cause problems.

Further, sulfur plants are also employed to process $H_2S$-containing gases from various types of industrial operations other than petroleum refining. Hydrogen sulfide from certain operations may contain nitrogen-containing compounds which can form ammonia in the sulfur plant noncatalytic combustion zone or thermal reactor. An example is the hydrogen sulfide which is recovered from coal gas, also known as coke-oven gas, which is formed from destructive distillation of bituminous coal. This gas often contains hydrogen cyanide (HCN) which is partially combusted in the thermal reactor but may be partially hydrolyzed therein to form gaseous ammonia. We have found that the combustion system can be designed to result in a high efficiency for combustion of HCN, with the ammonia concentration in the effluent being low enough that it does not cause a problem in the condensers and catalytic reactors of conventional sulfur plant; however, it may cause a problem in certain tail gas clean-up units.

In order to comply with the regulations of the Environmental Protection Agency, many sulfur plants now in operation or being designed employ some type of tail gas treating process to minimize the amount of sulfur compounds ultimately discharged into the atmosphere. One such treating process is known as the Cold Bed Adsorption (CBA) method. The CBA process is described in detail, for example, in U.S. Pat. No. 4,035,474. When $NH_3$ is present in the feed stream to the sulfur plant, however, a certain amount of $NH_3$ remains in the sulfur plant tail gas; i.e., the feed to the tail gas clean-up process, for example, the CBA unit. Ammonia present in the feed to the tail gas-clean up process can react with $SO_2$ present to form, for example, ammonium sulfite which is adsorbed on the catalyst during the sulfur adsorption portion of the cycle. Later in the regeneration portion of the cycle when the catalyst is heated with regeneration gas to desorb sulfur, $NH_3$ also is liberated. The liberated $NH_3$ can return in the regeneration gas to pass through the second Claus reactor and thence to the low temperature reactor now in the sulfur adsorption mode, where it can be again adsorbed on the catalyst. Thus, the ammonia can be repetitively adsorbed on the first CBA catalyst bed, then desorbed from the first CBA bed but readsorbed on the second CBA bed, then desorbed from the second but readsorbed on the first in the next cycle, and so forth. Continued operation in this manner can eventually cause the accumulation of solid ammonium salts deposited on the catalyst to be excessive and result in deactivation and plugging of the catalyst.

Solutions for this problem have been provided, but improved and alternative methods are needed. For example, one process is described in U.S. Pat. No. 4,391,790, which periodically returns at least a portion of the regeneration effluent stream itself to an ammonia decomposition catalytic reactor or to an ammonia combustion zone for the purpose of decomposing the ammonia. However, the regeneration effluent stream has a relatively low concentration of ammonia, which can decrease the conversion efficiency and can increase the energy requirement or fuel consumption of an ammonia conversion process. Therefore, effective methods of enriching the ammonia concentration of the regeneration effluent stream are highly desirable.

Particularly desirable are such improved and alternative processes for plants utilizing the Claus reaction for the recovery of sulfur for treating acid gas streams containing ammonia and/or other nitrogen compounds. Such an improved and alternative process and apparatus are hereinafter described.

SUMMARY OF THE INVENTION

The invention comprises method and apparatus for treating at least a portion of the regeneration effluent stream containing ammonia from an adsorptive Claus reactor undergoing regeneration and producing a regeneration effluent stream leaner in ammonia and a stream enriched in ammonia. The stream enriched in ammonia can be processed to reduce the concentration of ammonia therein, before further treatment to convert the sulfur components in the stream to elemental sulfur.

Thus, according to one aspect of the invention, a first stream comprising hydrogen sulfide, sulfur dioxide, and ammonia can be passed through a low temperature Claus catalytic conversion zone and elemental sulfur and ammonium compounds are deposited on catalyst therein. Subsequently, a hot regeneration stream derived from the Claus process can be passed in contact with the laden catalyst and the sulfur and ammonium compounds can be vaporized and removed producing a regeneration effluent stream containing elemental sulfur and ammonia. After removal of the elemental sulfur, at least a portion of the sulfur lean regeneration effluent stream can be introduced into an ammonia removal zone and ammonia can be removed and a regeneration effluent stream leaner in ammonia and another stream enriched in ammonia can be produced. The ammonia enriched stream can then be introduced into an ammonia conversion zone and, for example, the ammonia oxidized therein to nitrogen and water or decomposed to nitrogen and hydrogen. The regeneration effluent stream leaner in ammonia and/or such portion of the sulfur lean regeneration effluent stream which is not introduced into the ammonia removal zone can be returned to the Claus process downstream of the Claus thermal reaction zone and adjacent or downstream of the point where the regeneration stream is removed from the Claus process.

According to a particular aspect of the invention, the portion of the sulfur lean regeneration effluent stream to be introduced into the ammonia removal zone can be processed to convert all remaining sulfur compounds therein to a single sulfur species, preferably to hydrogen sulfide. The resulting gaseous single sulfur species stream can then be contacted with an aqueous stream to produce an aqueous stream enriched in ammonia and a gaseous stream leaner in ammonia. The aqueous stream enriched in ammonia can then be processed to produce a gaseous stream enriched in ammonia which can be further processed to reduce the ammonia concentration therein. The gaseous stream leaner in ammonia can be returned to the Claus process downstream of the Claus thermal reaction zone and adjacent and downstream of the point from which the regeneration stream was derived.

According to a further aspect of the invention, an acid gas stream comprising hydrogen sulfide and ammonia can be introduced into a thermal reaction zone (furnace) in which hydrogen sulfide and ammonia are combusted with oxygen to produce an effluent stream comprising elemental sulfur, hydrogen sulfide, sulfur dioxide, nitrogen, water and uncombusted ammonia. Minor amounts of other reaction products also can be produced, such as, for example, nitrogen oxides and hydrogen. At least sufficient ammonia can be thereby destroyed to prevent plugging or other problems due to accumulation of ammonium compounds in the downstream high temperature portion (Claus Plant) of the facility. The effluent stream, after removal of elemental sulfur, can then be introduced into a Claus (high temperature) catalytic conversion zone, comprising at least one reactor, operated at a temperature above the sulfur dewpoint of the gas, for example, in the range of about 350° F. (175° C.) to about 700° F. (370° C.). After removal of elemental sulfur, the resulting sulfur lean (first) stream can be introduced into a low temperature Claus catalytic conversion zone and ammonia removal and/or conversion zones as described for the above first stream.

BRIEF DESCRIPTION OF THE DRAWING

The invention will be further appreciated by reference to the following detailed description of the invention and the FIGURE which illustrates a preferred embodiment of the invention.

DETAILED DESCRIPTION OF THE INVENTION

An ammonia containing stream, for example, from a sour water stripper, and an acid gas stream containing hydrogen sulfide can be introduced by lines 2 and 6 into furnace 4 of a Claus thermal reaction zone A and combusted in the presence of oxygen, supplied, for example, by line 12. The acid gas stream can, if desired, be divided into two portions and one portion introduced into furnace 4 at the inlet and one portion in a second downstream zone, for example, by line 10. Combustion in furnace 4 can be generally at a temperature, for example, from about 2400° F. (1320° C.) to about 2600° F. (1427° C.), effective for decomposition of ammonia. Reactions involving hydrogen sulfide occurring in the furnace 4 of the thermal reaction zone A can include the following:

(1) $H_2S + 3/2O_2 = H_2O + SO_2$    Oxidation to $SO_2$
(2) $2H_2S + SO_2 = 2H_2O + 3S$    Claus Reaction
(3) $H_2S + \frac{1}{2}O_2 = H_2O + S$    Overall Reactions involving ammonia and hydrogen cyanide can include the following:

$$2NH_3 + 3/2O_2 = N_2 + 3H_2O \tag{4}$$

$$2HCN + 3/2O_2 = N_2 + 2CO + H_2O \tag{5}$$

Air is introduced by line 12 to correspond to about 0.5 moles oxygen per mole of hydrogen sulfide and about 0.75 moles oxygen per mole of ammonia or hydrogen cyanide. In addition, as discussed in greater detail below, additional air can be introduced by line 12 to compensate for sulfur dioxide converted to hydrogen sulfide when a portion of the sulfur lean regeneration effluent stream is introduced into a hydrogenation zone in accordance with one aspect of the invention. In furnace 4, a hot reaction mixture results which contains unreacted reactants, such as hydrogen sulfide and ammonia, as well as products such as elemental sulfur, sulfur dioxide, water, hydrogen, nitrogen, and the like. Preferably, ammonia is reduced to a level such that problems do not result in the zones of the Claus plant designated generally by letters A and B in the FIGURE. By reducing ammonia to about 35 ppm or less operating problems in the Claus plant can be avoided; nevertheless, remaining ammonia can cause problems in the tail gas cleanup unit as herein described.

The Claus thermal reaction Zone A can be any suitable means for carrying out the thermal Claus reactions represented by Reactions (1), (2), and (3) above and ammonia and/or hydrogen cyanide decomposition as represented by Reactions (4) and (5). In the preferred embodiment, a muffle furnace 4 having an associated waste heat boiler 14 is utilized. After cooling in waste heat boiler 14, the hot reaction products effluent stream can be removed by line 24, and cooled in condenser 18 to below about 400° F. (204° C.) to condense and remove elemental sulfur by line 20. The sulfur lean effluent stream can then be provided by line 22 to Claus catalytic conversion zone B. In the illustrated embodiment a portion of hot effluent can be removed from waste heat boiler 14 by line 16 at an elevated temperature, for example, at about 1100° F. (600° C.), after a single pass therethrough and can be utilized to reheat the sulfur lean process stream in line 22. Other methods of reheat can, of course, also be used.

Claus catalytic conversion zone B includes at least one Claus catalytic reactor, for reacting hydrogen sulfide and sulfur dioxide to form elemental sulfur at temperatures from above the sulfur dewpoint of the gas to about 700° F. (370° C.), followed by a sulfur condenser for the recovery of elemental sulfur. Two or even three or more Claus catalytic reactors can be utilized. The reactor(s) contain catalyst effective to facilitate the Claus reaction (2) shown above, and also to facilitate carbonyl sulfide (COS) and carbon disulfide ($CS_2$) hydrolysis if such are present. An alumina catalyst, such as, for example, Kaiser S-201 alumina catalyst, available from Kaiser Chemicals, has proven particularly satisfactory by reason of economy and effectiveness. Other Claus catalysts can, of course, also be used.

Referring to the FIGURE, Claus catalytic conversion zone B comprises a first Claus catalytic reactor 26 into which an inlet stream is provided by line 22 at an inlet temperature preferably in the range of about 430 to about 550° F. (221° C. to 288° C.). Higher temperatures in this range, for example, above about 500° F. (260° C.) can be utilized if carbonyl sulfide or carbon disulfide are present or if required to result in the desired effluent temperature for regeneration gas extracted in line 30 from line 28. The inlet stream can flow through, for example, a supported bed of alumina catalyst where reaction (2) above is facilitated and the effluent stream containing elemental sulfur, unreacted hydrogen sulfide, sulfur dioxide, and ammonia can exit by line 28.

The effluent stream from first reactor 26 can be provided by line 28 to second sulfur condenser 34 in which the effluent stream is cooled and elemental sulfur condensed and removed by line 36 and the resulting sulfur lean stream from the second condenser provided by line 38 to reheat exchanger 40.

Reheat exchanger 40 can heat the effluent from second condenser 34 to a suitable inlet temperature, for example, about 205° C. (400° F.) in line 42 provided to the second Claus reactor 44. The process stream flows in contact with the catalyst in reactor 44 where reaction (2) is facilitated and an effluent stream containing elemental sulfur, hydrogen sulfide, sulfide dioxide, and ammonia can be removed by line 46 and provided to third sulfur condenser 48 where the stream is cooled. Product sulfur can be withdrawn through line 50 while the uncondensed phase can be taken off through line 52 and fed to reactor 54 in low temperature Claus catalytic conversion zone C.

Low temperature Claus catalytic conversion zone C can contain one or more additional Claus reactors as described above but operated at a temperature effective for depositing formed elemental sulfur on the catalyst, for example, in the range of about 160° F. (70° C.) to about 330° F. (165° C.). Periodically, reactors 54 and 32 are alternated, reactor 32 then being on adsorption, sulfur is removed from laden catalyst by passing a hot regeneration stream in contact with the catalyst to vaporize and remove elemental sulfur and to regenerate the catalyst. Preferably, two or more reactors can be used so that one or more reactors is on adsorption while the other is being regenerated. In the FIGURE, reactor 54 is shown on adsorption and reactor 32 is shown on regeneration. Periodically, reactors 54 and 32 are alternated, reactor 32 then being on adsorption and reactor 54 being on regeneration. Piping and valving for such switching are not shown, but are well within the skill of a person skilled in the sulfur recovery arts.

Thus, referring to the FIGURE, the uncondensed phase from condenser 48 can be fed by line 52 to low temperature reactor 54, for example, a CBA reactor, which is shown on adsorption phase of the cycle. Elemental sulfur can be adsorbed on the catalyst bed in reactor 54 operated, for example, at a temperature between about 270° F. (132° C.) and 300° F. (148° C.), while tail gas from reactor 54 flows to a tail gas analyzer 138 and then can be discharged to a tail gas incinerator through line 56.

In the regeneration of the catalyst bed in a second low temperature reactor 32 shown on regeneration phase of the cycle, a hot regeneration gas stream at a temperature of, for example, about 650° F. (340° C.) can be introduced, for example, from downstream of the first Claus reactor 26, through line 30. Other sources of regeneration gas can, of course, also be used.

Thus, the source within the Claus plant of the hot regeneration stream fed to the reactor being regenerated can vary from one plant to another. One embodiment is shown in the FIGURE and will be discussed in further detail below. According to this embodiment, a portion or all of stream 28, the effluent from the first high temperature catalytic reactor 26 can be used as the regeneration gas stream.

According to another embodiment, all or a portion of stream 42, after condensation and removal of sulfur in condenser 34 and reheating to a suitable temperature in reheater 40 can be utilized as regeneration gas. Still other embodiments of streams that may be used as regeneration streams in particular plants include such as, for example, stream 46 (effluent from the second Claus catalytic reactor 44) or stream 52 (effluent from the condenser 48 downstream of the second Claus reactor 44) with such stream being further reheated to a suitable regeneration gas temperature. Other sources of regeneration gas derivable from the Claus in accordance with the invention can be provided by those skilled in sulfur recovery arts.

Regardless of the source of the regeneration gas derived from the Claus process, a similar problem can develop in sulfur recovery units utilizing feed gas streams containing ammonia when the tail gas treatment includes alternating Claus catalytic reactors operated under conditions, including temperature, such that a preponderance of formed sulfur is deposited on the catalyst. In such cases, after the hot gas is used for catalyst regeneration, it is returned to some point in the process adjacent or downstream from the point at which it was derived for further recovery of sulfur therefrom. In such case, after the hot gas is used for catalyst regeneration and then is returned to some point in the process, the gas will reintroduce to the process any ammonia which was desorbed from the catalyst during regeneration, unless the regeneration effluent gas is properly treated to destroy the ammonia. Thus, in the embodiment illustrated in the FIGURE, the regeneration effluent gas stream 60 from regeneration reactor 32 can be cooled in condenser 62 to remove sulfur and a portion can then be returned via blower 68 and lines 70A and 76 to a point in line 28 just downstream of the point of removal of the regeneration gas stream 30 from line 28. In similar fashion, if all or a portion of stream 42 is utilized as a source for regeneration gas, for example, then the regeneration effluent stream can subsequently be returned to the same line at a point just downstream from where the regeneration gas was extracted. Likewise, if all or a portion of stream 52 is utilized as a source of regeneration gas, then this portion can be provided to a reheater (not shown) to reactor 32 undergoing regeneration, to a sulfur condenser, and then, for example, the sulfur lean regeneration effluent stream can be reintroduced to line 52 just downstream of the point at which it was extracted, thence flowing to reactor 54 which is operating in a sulfur adsorption mode for the further recovery of sulfur.

Thus, in all the cases discussed, the ammonium salts previously deposited on the catalyst during an adsorption mode may be decomposed to form gaseous ammonia during regeneration which may then be reintroduced to the flow stream and will eventually flow to the final Claus reactor which is operating in a low temperature adsorptive mode so that the ammonia is again redeposited on the catalyst. The ammonia thus can be continually desorbed and readsorbed during each step of the cycle so long as it is not removed from the system; and further, its concentration in the catalyst bed continually increases as further gas is processed and the concentration of ammonia in the regeneration effluent gas stream can continually increase until the catalyst becomes deactivated and severe deposits of solids in condensers or sulfur seal pots can occur. Thus, it can be seen that these severe problems can result regardless of the source within the plant of the hot regeneration gas derived from a Claus process stream when the sulfur lean regeneration effluent stream is returned to the process adjacent or downstream of the point from which the regeneration stream was derived.

As indicated, the hot regeneration gas used in the regeneration step vaporizes elemental sulfur and also decomposes and desorbs ammonium compounds from the catalyst and can be withdrawn as a regeneration effluent stream containing elemental sulfur and ammonia through line 60 and sent to condenser 62 operated, for example, at an effluent temperature of 350° F. (175° C.) where elemental sulfur can be taken off through line 64. The uncondensed phase can be withdrawn through line 66 and sent to blower 68 with the blower outlet stream for example, at 390° F. (200° C.) divided into two streams, 70A and 70B which can have associated valves (not shown). During regeneration of reactor 32, a characteristic sequence can be observed. The ammonium compounds on the catalyst are decomposed and $NH_3$ is driven off the catalyst during, for example, the first portion of the regeneration period. In the remaining portion of the regeneration period, elemental sulfur is removed from the catalyst. See, for example, FIG. 2, and accompanying description, of U.S. Pat. No. 4,391,790 which is herein incorporated by reference. After sulfur has been substantially removed from the catalyst ending the regeneration portion of the cycle, the cooling portion of the cycle can be conducted using procedures which are known to those skilled in the art.

All or a portion of the regeneration effluent stream in line 66 from low temperature Claus catalytic conversion Zone C can be removed by means of blower 68 and line 70B at least during the portion of the regeneration cycle during which ammonium compounds are removed from the catalyst, and can be provided to an an ammonia removal Zone D where substantially all of the sulfur compounds present can be converted to hydrogen sulfide and where ammonia is removed to produce a lean regeneration effluent stream which can be returned, for example, by lines 112 and 76 to zone B. Following the ammonia removal portion of the regeneration period, a substantial fraction or all of the regeneration effluent stream in line 66 can be returned by blower 68 and line 70A to zone B. Following the ammonia removal portion of the regeneration period it generally is desirable to route a substantial portion of the stream in line 66 through line 70A to zone B. Blower 68 may also be used at that time to continue flow of a minor portion to line 70B, in order to maintain proper flow and operating conditions in the equipment of zone D to be ready for use again when needed, and also to continue a minor flow of gas from zone D to furnace 4 via line 106 and from line 106 through line 130 to blower 68 if desired.

As indicated, the regeneration stream derived from the Claus process in accordance with the invention contains both hydrogen sulfide and sulfur dioxide, in addition to the gaseous ammonia. In the Claus process, hydrogen sulfide reacts with sulfur dioxide in the gaseous phase in the presence of a catalyst to form gaseous water and elemental sulfur. If the two reactants, hydrogen sulfide and sulfur dioxide, are introduced into liquid water solution at lower temperatures, such as from about normal room temperature (70° F.) to about the atmospheric boiling point of water (212° F.), then sulfur is also formed and the sulfur formed is generally difficult to process because it is a solid dispersed in the water. For example, filtration to remove the sulfur can be difficult, especially because the sulfur often is in colloidal form. Heating of the suspension followed by separation of liquid sulfur can also create difficulties. Usually it will be necessary to heat the water under pressure to the melting point of sulfur, and then to separate the liquid sulfur phase from the liquid water phase. This can produce a large volume waste water stream still containing traces of elemental sulfur and various byproduct sulfur compounds, for which waste disposal facilities must be provided. Furthermore, the byproduct sulfur compounds formed in the aqueous reaction mixture described above are corrosive, which increases the cost of the equipment and of waste disposal facilities, and the presence of these compounds can turn the large volume water streams into a waste stream, even if the water phase were completely free of elemental sulfur.

Water absorption is a known method for removing ammonia from gaseous streams in a refinery and this absorption process operates with no significant problem when hydrogen sulfide also is present. However, as indicated, this method cannot be used to remove ammonia from regeneration gas in a Claus sulfur plant because of severe problems that would occur when both hydrogen sulfide and sulfur dioxide are present in the stream, along with ammonia. On the other hand, the process in accordance with the invention makes it feasible to produce not only an ammonia-lean regeneration effluent stream that can be beneficially returned to the Claus process for further sulfur recovery downstream of the thermal reaction zone or furnace and adjacent or downstream of the point from which the regeneration stream is derived, but also an enriched ammonia stream that can be processed to destroy the ammonia and convert the hydrogen sulfide content to sulfur and even, if desired, a purified water stream can be produced and can be used in the plant as a source of boiler feed water or for other purposes.

Thus, in accordance with the invention, the sulfur containing compounds of the portion of the regeneration effluent stream to be introduced into the ammonia can be converted in zone D to hydrogen sulfide in a hydrogenation zone. The hydrogenation zone can be either catalytic or noncatalytic, although a catalytic hydrogenation zone is preferred. Useful catalysts are those containing metals of Groups VB, VIB, VIII and the Rare Earth series of the Periodic Table of the Elements, as published in Perry, *Chemical Engineers' Handbook*, Fifth Edition, 1973. The catalyst may be supported or unsupported although catalysts supported on a silica, alumina, or silicaalumina base are preferred. The preferred catalysts are those containing one or more of the metals, cobalt, molybdenum, iron, chromium, vanadium, thorium, nickel, tungsten and uranium. Particularly preferred are standard cobaltmolybdenum type hydrogenation catalysts, for example, United Catalyst Type C29-2 available from United Catalysts Incorporated, Louisville, Ky., 40232.

The reducing equivalents, hydrogen and carbon monoxide, necessary for converting sulfur-containing compounds to hydrogen sulfide in the hydrogenation zone can be provided from an external source (not shown in the FIGURE) or can be present within the regeneration effluent stream. Preferably, the hydrogen can be present in the regeneration effluent stream. However, if insufficient reducing equivalents are present, then, for example, a reducing gas generator can be used for the partial combustion of fuel gas to produce reducing equivalents in the form of hydrogen and carbon monoxide. Other methods of providing hydrogen will be readily apparent to those skilled in sulfur recovery.

The hydrogenation reactor can be operated at a temperature in the range of about 450° F. (230° C.) to about 650° F. (345° C.) when a catalyst as described above is present. Preferably, the hydrogenation reactor is operated at a temperature from about 580° F. (300° C.) to about 650° F. (345° C.) to provide adequate initiation and conversion of the sulfur containing compounds to hydrogen sulfide.

Thus, referring to the FIGURE, the regeneration effluent stream can be provided by line 70B to hydrogenation zone preheater 84. Regeneration zone preheater 84 can have air introduced by line 82 and fuel gas, for example, methane, introduced by line 80. In addition to preheating, the preheater can be used, if needed, for generating reducing equivalents, for example, hydrogen, which can be admixed with the regeneration effluent stream in line 70B to form a hydrogen-enriched heated regeneration effluent stream which can be provided by line 86 to hydrogenation reactor 88 containing, for example, a supported bed of effective hydrogenation catalyst. Substantially all sulfur compounds can be converted in reactor 88 to hydrogen sulfide and the resulting stream containing hydrogen sulfide and remaining unconverted ammonia can be removed by line 89.

Following conversion of the sulfur containing compounds to hydrogen sulfide, the process stream in line 89 can be provided to an ammonia removal zone in which the process stream is scrubbed with water and ammonia is removed therefrom to produce an ammonia lean regeneration effluent stream in line 112 and a concentrated ammoniacontaining gaseous stream in line 106.

It is preferred that the hydrogen sulfide containing regeneration effluent stream in line 89 be cooled to a temperature in the range of from about the water dewpoint for the hydrogen sulfide containing regeneration effluent stream to about 250° F. (120° C.) before introduction into the ammonia removal zone, which can comprise an ammonia absorption column and a stripping column to remove ammonia from the absorption column rich solvent stream.

In the ammonia absorption column, the hydrogen sulfide containing regeneration effluent stream can preferably be contacted with water having a temperature in the range from about 150° F. (65° C.) to about 200° F. (93° C.), the exact temperature depending on the water dewpoint temperature of the feed gas to the column. The water serves to remove at least the predominant part of the remaining ammonia therefrom. During contacting, the ammonia together with a portion of hydrogen sulfide which is present will dissolve in the water resulting in an aqueous stream containing ammonia and ammonia derived compounds. These latter can include, for example, ammonium hydroxide as well as ammonium sulfide and ammonium hydrosulfide and the like which can be formed by reaction with hydrogen sulfide present. A purified gaseous stream from which the predominant part of the ammonia has been removed also results and can be returned by line 112 to the process as illustrated.

The point at which stream 70A and 112 are to be returned to the process can be selected by the designer for any particular plant in accordance with the invention. For example, the streams can be combined in line 76 and flow to line 28 as shown in the FIGURE. Alternatively, stream 70A may flow to line 38 and enter reheater 40 while stream 112 goes to line 42 downstream of reheater 40. Generally, however, the ammonia lean regeneration stream and such portion of the sulfur lean regeneration effluent stream which is not provided to the ammonia removal zone will be returned to the process adjacent downstream of the point from which the regeneration stream was derived for further recovery of sulfur.

The hydrogen sulfide containing regeneration stream entering the ammonia absorption column has a certain water dewpoint temperature depending on the operating pressure at this point and on the concentration of water vapor in the stream. As the gas flows upward through the ammonia absorption column it is cooled to about the same temperature as that of the water solvent being fed to the top of the column. For purposes of removing the ammonia, it is generally preferred to cool the gas to about 9°–36° F. (5°–20° C.) lower than the water dewpoint of the inlet gas. Increased cooling would increase the solubility of ammonia in the aqueous solvent; however, it also promotes condensation of water from the gas, which increases the heat duty and increases the amount of cooling water required. If it is desired to operate the absorption column at a lower temperature in order to condense additional water from the inlet gas, it may be done by feeding water to the top of the absorption column at a lower temperature. However, it may be more economical, for purposes of ammonia removal only, to provide a minimum amount of cooling below the water dewpoint of the inlet gas. Ammonia together with some hydrogen sulfide having been absorbed from the gas in the absorption column, the resulting aqueous solution then flows to a sour water stripper. The preponderance of the hydrogen sulfide, however, is removed overhead from the adsorption column and returned to the Claus process adjacent and downstream of the point at which the regeneration stream was removed for further recovery of sulfur.

The aqueous stream containing the ammonia and ammonia-derived compounds can be provided to a sour water stripper where minor amounts of hydrogen sulfide, ammonia, and any ammonia derived compounds can be removed from the aqueous stream and recycled in a gaseous form to ammonia conversion Zone E which can preferably comprise the Claus furnace itself; however, a separate conversion zone, for example, a catalytic conversion zone or separate combustion zone is also within the scope of the invention described herein. It will be appreciated that the effect of removing ammonia from the regeneration effluent stream as herein described is to effectively increase the concentration of ammonia in the gaseous stream which is provided to the ammonia conversion zone. As a result, the vessels and piping of the ammonia conversion zone can be reduced in size as compared with what would be required in the absence of such concentrating of the ammonia and efficiency of the ammonia removal process will be correspondingly increased.

In addition, in applications where an existing sour water stripper forms a portion of the feedstream 2 to the Claus thermal reaction zone A, the existing unit can be effectively utilized as part of zone D. For example, in this instance, equipment items stripper 100, reboiler 122, pump 94, filter 120, cooler 96, associated piping and line 106 would not be required in the sulfur recovery unit since the absorbate in line 93 would go to an existing sour water stripper and the ammonia and hydrogen sulfide would return in line 2.

Referring again to the FIGURE, effluent from the hydrogenation reactor 88 can be provided by line 89 to cooler 90. The cooled effluent in line 91 can then be provided to ammonium absorption column 92. In ammonium absorption column 92, the cooled regeneration effluent is contacted with an aqueous stream provided by line 97 and ammonia removal is achieved producing a cooled gaseous stream 118 of reduced ammonia content. Heat can be recovered from the hydrogenation effluent stream in line 89 by utilizing an indirect heat exchanger, for example, a shell-and-tube exchanger, as cooler 90 and passing the stream in line 118 in indirect heat exchange relation with the hydrogenator effluent stream in line 89 to produce a heated stream in line 112 for return to the process.

The aqueous stream containing ammonia and ammonia derived compounds as well as hydrogen sulfide can be removed from ammonia absorption column 92 by line 93 and can flow to sour water stripper 100.

From sour water stripper 100, the stripped water effluent can be removed by line 102. A first portion can be returned to the ammonia absorption column 92 by line 128, pump 94, filter 120, line 95, cooler 96 and line 97. A second portion can flow through line 104 to reboiler 122 to form stripping vapors which flow through line 124 to the bottom of column 100. A third portion can be removed by line 126. The free ammonia and hydrogen sulfide and also the ammonia and hydrogen sulfide formed by decomposition of ammonia-derived compounds can be stripped from the aqueous solution in sour water stripper 100 and removed in a gaseous stream by line 106. The gaseous stream in line 106 will comprise predominantly water vapor, hydrogen sulfide, and ammonia; some carbon dioxide may also be present. At least a portion at intervals of the gaseous stream in line 106 can be provided to an ammonia conversion Zone E, or a portion of the gaseous stream in line 106 may be recycled via line 130 to blower 68. When not being sent to an ammonia conversion zone E, the gaseous stream in line 106 may be recycled via line 130 to blower 68.

The ammonia conversion zone E can comprise any suitable means for converting ammonia to nitrogen and water or nitrogen and hydrogen. The conversion can be carried out by combustion, for example, in Claus thermal reaction zone A, or in a separate combustion zone, or by catalysis in the presence of an effective ammonia decomposition catalyst.

Thus, according to one aspect, the ammonia containing stream in line 106 can be combusted in the presence of oxygen to form nitrogen and water, for example, in the Claus furnace 4 or in a separate combustion zone. Minor amounts of other products such as nitrogen oxides and hydrogen may also produced in the combustion step.

Alternatively, the concentration of ammonia in the gas returning in line 106 can be reduced by passing at least a portion of the stream through a catalyst bed to decompose the ammonia to form nitrogen and hydrogen. The catalyst can be any suitable catalyst effective for decomposition of the ammonia to form nitrogen and hydrogen. Such catalysts can include, for example, catalysts as described in Canadian Pat. No. 1,004,030 (1977) comprising at least one metal sulfide of Group VB, Group VIB, the third period of Group VIII and the Rare Earth Series supported on an alumina, silica, or silica alumina base at a temperature of at least about 1000° F. Preferably, the catalyst employed contains one or more sulfides of the metals iron, nickel, cobalt, molybdenum, vanadium, and thorium deposited or coprecipitated on the support. This embodiment of the invention is represented in the FIGURE by dashed line 108, heater 110, line 113, catalytic reactor 114, and line 116. Dashed line 108 can feed at least a portion of the stream in line 106 to heater 110 to raise the temperature preferably to the range of about 1200° F. (650° C.) to about 1500° F. (815° C.). The effluent of heater 110 is fed through line 113 to catalytic reactor 114 where ammonia is decomposed in the presence of a catalyst as described above. The output of reactor 114 is provided through line 116 to line 76 and can be treated further as described herein.

A significant aspect of any chemical process such as a sulfur recovery plant in accordance with the invention is monitoring and control of process variables. As indicated above, only a portion of the sulfur lean regeneration effluent stream, for example, only a portion of the gas from blower 68 flows to zone D for hydrogenation and ammonia removal, while the other remaining portion can be returned to the Claus process flow stream, for example, through lines 70A and 76. The flow through line 70A and 70B can be controlled by analyzing for the ammonia content of the gas. During a portion of each CBA cycle, the ammonia concentration will remain low and most of the gas will be returned to the Claus process through line 70A. When regeneration starts and the catalyst in the regeneration reactor 32, for example, is being heated, the increasing temperature promotes evolution of gaseous ammonia as the deposited ammonium compounds decompose. Responsive to this condition, a larger portion of the gas can be diverted from line 70A into line 70B as the ammonia concentration of the gas increases. The gas flowing through line 70B can be treated in hydrogenation and ammonia absorption zone D, and then can be returned, for example, through line 112 to line 76 in the illustrated embodiment. As the regeneration step nears completion, the ammonia concentration of the gas from blower 68 again declines, and some of the gas can be diverted from line 70B to line 70A.

In accordance with the instant invention, a Claus sulfur recovery plant can be operated satisfactorily without obtaining complete destruction of ammonia in the Claus furnace. If the furnace is designed and operated correctly to reduce the ammonia concentration to a low level such as set forth, for example, in the laboratory example in the BACKGROUND OF THE INVENTION, then normally the presence of the ammonia does not cause a problem. Therefore, some low level of ammonia concentration in the Claus process gas is permissible. This low level may result in a minor amount of solid ammonium compounds being deposited on the catalyst but not in large enough amounts to significantly reduce the catalyst activity. The problem to which the instant invention is directed arises in a tail gas clean-up process utilizing alternating adsorptive-reactors which are cycled through regeneration and adsorption. The problem is caused by the periodic transfer and recycle of the ammonia between the adsorptive reactors which causes its concentration in the gas to periodically become very high and which can soon result in unacceptably high deposits on the adsorptive catalyst. This can be prevented by the process of the instant invention by removing ammonia from a portion of the sulfur lean regeneration gas stream, that is, for example, from the gas in line 70B.

Consider hypothetically the situation in which all of the gas from blower 68 flows through line 70B. This can result in very low levels of ammonium salt deposition on the adsorptive catalyst. Next, consider hypothetically the situation in which half of the gas is sent through line 70B and half through line 70A. In this case, the ultimate concentration of ammonium deposits on the catalyst would be about two times that of the first hypothetical situation, but would still be acceptable. Therefore, the equipment in zone D can be relatively small because the flow capacity of the equipment in zone D can be as little as 25-50% of the capacity for other plant equipment, and perhaps even smaller. Thus, preheater 84, hydrogenator 88, exchanger 90 and absorber 92 of zone D can be sized for significantly smaller flows than the remaining equipment in the plant. The capacity required for the sour water stripper 100 and its associated equipment can be even lower because of the relatively low level of ammonia in the gas from blower 68. Further, as pointed out above, the sour water stripper can already exist in the refinery and such can be used for stripper 100 and its associated equipment.

An important variable to be controlled in sulfur recovery plants in accordance with the instant invention is the air rate in line 12. The air supplied must be equal to the amount required for suitable combustion of all components in the feed gases to the furnace 4 and to compensate for the sulfur dioxide converted to hydrogen sulfide in accordance with the instant invention. The combustible components include, for example, hydrocarbons and hydrogen sulfide in the acid gas stream 6, ammonia and hydrogen sulfide in sour water stripper gas stream 2 and also ammonia and acid gas in returned sour water stripper gas stream 106. Control details will vary from plant to plant and can be readily provided by the person skilled in the sulfur recovery arts in accordance with the instant invention. By way of illustration, the FIGURE shows a system which has a single valve 142 to control the flow rate of air stream 12. More than one valve can, of course, also be used. In the illustrated embodiment, the opening of the air valve 142 can be controlled by the flow rate controller 140. This can be, for example, a multifunctional instrument to which is fed signals from a number of control elements, such as, for example, from elements 132, 134, 136, and 138. Control elements 132, 134, and 136, for example, can measure the flow rates of streams 2, 106, and 6, respectively, then attenuate the flow rate signal produced by a respective control element by a factor which represents the ratio of air volume required for combustion per unit volume of the respective feed gas flow. Such factors can be readily calculated by persons skilled in the sulfur recovery arts. The resulting signal then represents an air rate required for the total feed gas at a particular time and goes to flow rate controller 140, which sums the three signals from elements 132, 134, and 136, and can then open or close valve 142 in proportion to the size of the total of these three signals. In the illustrated system, the attenuation setting of each control element can be adjusted periodically by an operator based on data concerning composition of the particular stream.

In order to successfully process feed streams which contain ammonia, a tail gas analyzer is highly desirable, and element 138 illustrates the use of such a tail gas analyzer in accordance with the instant invention. The ultimate test which determines whether the correct air rate is being provided to furnace 4 by stream 12 is the hydrogen sulfide/sulfur dioxide ratio in the tail gas stream 56. This ratio must be maintained very close to 2.0 on a molar or volume basis for optimum recovery. The stream 56 can be continuously or periodically analyzed by tail gas analyzer 138 which can send a signal to air flow rate controller 140 indicating whether more air or less air is needed to maintain the hydrogen sulfide/sulfur dioxide ratio at a close approximation to 2.0. The flow rate controller 140 can then continuously add this signal to the signals from control elements 132, 134 and 136 and can make a corresponding adjustment in valve 142.

As indicated above, substantially all sulfur components in the gas flowing in line 70B are converted to hydrogen sulfide in hydrogenator 88. In the normal case, this will include sulfur dioxide in the ratio of about 1:2 to hydrogen sulfide. This conversion of sulfur dioxide to hydrogen sulfide increases the amount of air required in line 12 when the hydrogen sulfide is returned to the Claus process because, although some of the hydrogen sulfide formed in hydrogenator 88 can be returned to the furnace 4 in stream 106 from sour water stripper 100, the preponderance of the hydrogen sulfide formed will be in overhead stream 118 from adsorber 92 which is returned through lines 112 and 76 to an appropriate point in the process, such as, to line 28 as illustrated in the FIGURE or to line 38 or line 42 as further examples. The increased volume of hydrogen sulfide returning in line 76 does not cause a problem in the process according to the invention because the increased volume of hydrogen sulfide is taken into account by increasing the amount of sulfur dioxide in stream 28 by the action of tail gas analyzer 138 and flow rate controller 140. For the illustrated embodiment of the FIGURE, the rate of stream 86 which flows to hydrogenator 88 must be limited to not more than about ⅔ of stream 28, or preferably not more than about ½ of stream 28. The exact limit will depend on the amount of various constituents such as carbon sulfides and elemental sulfur which are present in stream 86 and are converted to hydrogen sulfide in hydrogenator 88. If none of these is present in stream 86 and if the reaction mixture in stream 28 contains substantially all sulfur dioxide with a relatively small amount of hydrogen sulfide, then ⅔ of stream 28 may be sent via line 70B and 86 to hydrogenator 88 where the sulfur dioxide can be converted to hydrogen sulfide, most of which can then return in line 112, and result in the required value of 2:1 for the hydrogen sulfide:sulfur dioxide ratio. As stated above, instead of the absolute maximum of sending about ⅔ of the stream in line 28 to the ammonia removal zone via lines 70B and 86, a design limit of about ½ or less is generally preferred.

Returning hydrogen sulfide in line 112 to the Claus process will not cause a problem because the air flow rate controller continually functions to increase the air rate in line 12 to furnace 4 to produce a greater proportion of sulfur dioxide and thereby maintain the hydrogen sulfide/sulfur dioxide ratio in tail gas stream 56 at about a 2:1 ratio.

It will be appreciated that there has been described a process for treating a regeneration effluent stream containing ammonia from an adsorptive Claus reactor undergoing regeneration which significantly reduces the volume of ammonia containing gas which must be processed. Other embodiments and applications in the spirit of the invention and within the scope of the appended claims will be apparent to those skilled in the art.

What is claimed is:

1. In a Claus process for the recovery of sulfur, the steps comprising:
    passing a first stream containing hydrogen sulfide, sulfur dioxide, and ammonia through a low temperature Claus catalytic conversion zone and depositing elemental sulfur and ammonium compounds on catalyst therein;
    deriving a regeneration stream from the Claus process and regenerating the resulting laden catalyst therewith vaporizing sulfur and ammonia therefrom and producing a regeneration effluent stream comprising elemental sulfur and ammonia;
    cooling the regeneration effluent stream and condensing elemental sulfur therefrom and producing a sulfur lean regeneration effluent stream;
    introducing at least a portion of the sulfur lean regeneration effluent stream into a hydrogenation zone and converting substantially all sulfur compounds therein to hydrogen sulfide, and introducing the resulting hydrogen sulfide containing stream into an ammonia removal zone and contacting said resulting stream with a first aqueous stream and producing a second aqueous stream enriched in ammonia and producing a sulfur lean regeneration effluent stream reduced in ammonia content;
    removing ammonia from the second aqueous stream and producing an ammonia enriched stream;
    returning the sulfur lean regeneration effluent stream reduced in ammonia content to the Claus process adjacent and downstream of the point of derivation of the regeneration stream for the further recovery of sulfur therefrom; and
    introducing the ammonia enriched stream into an ammonia conversion zone and reducing the concentration of ammonia therein.

2. The Process for the recovery of sulfur as in claim 1 comprising:
    introducing a gaseous feedstream comprising hydrogen sulfide and ammonia into a Claus thermal reaction zone, reacting hydrogen sulfide and ammonia therein with an oxidant, and producing an effluent products stream containing elemental sulfur, hydrogen sulfide, sulfur dioxide, and uncombusted ammonia;
    cooling the effluent products stream in a first condensing zone and condensing elemental sulfur therefrom and producing a sulfur lean effluent products stream; and
    passing the sulfur lean effluent products stream through a catalytic sulfur recovery zone in which elemental sulfur is formed at a temperature above the sulfur dewpoint temperature of the gas and thereafter condensed and removed and producing the first stream processed as set forth in claim 1.

3. The Process for the recovery of sulfur as in claim 2 further comprising:
returning a remaining portion of the sulfur lean regeneration stream not introduced into the ammonia removal zone to the Claus process adjacent and downstream of the point of derivation of the regeneration stream for the further recovery of sulfur therefrom.

4. The Process for the recovery of sulfur as in claim 3 wherein:
said at least a portion of the sulfur lean regeneration stream introduced into the ammonia removal zone comprises less than about two-thirds of the sulfur lean regeneration effluent stream.

5. The Process as in claim 2 further comprising:
adjusting production of sulfur dioxide in the thermal reaction zone to compensate for sulfur dioxide removed during hydrogenation of said at least a portion of the sulfur lean regeneration effluent stream.

6. The Process in claim 5 comprising:
sensing the hydrogen sulfide:sulfur dioxide ratio and adjusting the air rate to the thermal reaction zone and maintaining said ratio at about 2:1.

7. The Process as in claim 1 wherein the ammonia conversion zone comprises a combustion zone in which ammonia and oxygen are combusted to produce nitrogen and water.

8. The Process as in claim 1 wherein the ammonia conversion zone comprises the thermal reaction zone of a Claus plant.

9. The Process as in claim 1 wherein the ammonia conversion zone comprises a catalytic converter for converting ammonia to nitrogen and hydrogen.

10. The Process as in claim 1 comprising:
increasing the flow of the sulfur lean regeneration stream into the hydrogenation zone during a portion of the regeneration period during which ammonia is being removed from laden catalyst.

11. Apparatus for the recovery of sulfur comprising:
Claus process means for receiving a gaseous stream comprising hydrogen sulfide and ammonia and for producing and recovering elemental sulfur therefrom and for producing a first gaseous stream comprising hydrogen sulfide, sulfur dioxide, and ammonia, the Claus process means further comprising adsorptive conversion means for receiving the first gaseous stream and for forming and depositing elemental sulfur and ammonium compounds on catalyst therein;
regeneration means in flow communication with the adsorptive conversion means for deriving a regeneration stream from the Claus process and for regenerating laden catalyst in the adsorptive conversion means and for producing a regeneration effluent stream comprising elemental sulfur and ammonia;
condensing means in flow communication with the regeneration means for receiving the regeneration effluent stream and for condensing elemental sulfur therefrom and for producing a sulfur lean regeneration effluent stream;
hydrogenation means in flow communication with the condensing means for receiving at least a portion of the sulfur lean regeneration effluent stream and for hydrogenating substantially all sulfur compounds therein to hydrogen sulfide;
ammonia removal means in flow communication with the hydrogenation means for receiving the resulting hydrogen sulfide containing stream and for removing ammonia from said stream and producing a sulfur lean regeneration effluent stream reduced in ammonia content and an ammonia enriched stream;
means for returning the sulfur lean regeneration effluent stream reduced in ammonia content to the Claus process means adjacent and downstream of the point of derivation of the regeneration stream for the further recovery of sulfur therefrom; and
ammonia conversion means in flow communication with the ammonia removal means for receiving the ammonia enriched stream and for reducing the concentration of ammonia therein.

12. The Apparatus as in claim 11 further comprising:
means for returning a remaining portion of the sulfur lean regeneration stream not introduced into the ammonia removal zone to the Claus process adjacent and downstream of the point of derivation of the regeneration stream for the further recovery of sulfur therefrom.

13. The Apparatus as in claim 11 wherein the Claus process means further comprises:
Claus thermal reaction means for receiving a gaseous feedstream comprising hydrogen sulfide and ammonia and for reacting with an oxidant and for producing an effluent products stream containing elemental sulfur, hydrogen sulfide, sulfur dioxide, and uncombusted ammonia;
condensing means in flow communication with the Claus thermal reaction means for receiving the effluent products stream for condensing elemental sulfur therefrom and for producing a sulfur lean effluent products stream;
catalytic means in flow communication with the condensing means for receiving the sulfur lean effluent products stream and for forming elemental sulfur and for producing a sulfur rich effluent stream; and
condensing means in flow communication with the catalytic means for receiving the sulfur rich effluent stream for condensing elemental sulfur therefrom and for producing the first gaseous stream provided to the conversion means.

14. The Apparatus as in claim 11 wherein the ammonia conversion means comprises combustion means for combusting ammonia and oxygen to nitrogen and hydrogen.

15. The Apparatus as in claim 11 wherein the ammonia conversion means comprises a Claus furnace of a Claus plant.

16. The Apparatus as in claim 11 wherein the ammonia conversion means comprises catalytic means for catalytically decomposing ammonia to nitrogen and hydrogen.

* * * * *